UNITED STATES PATENT OFFICE.

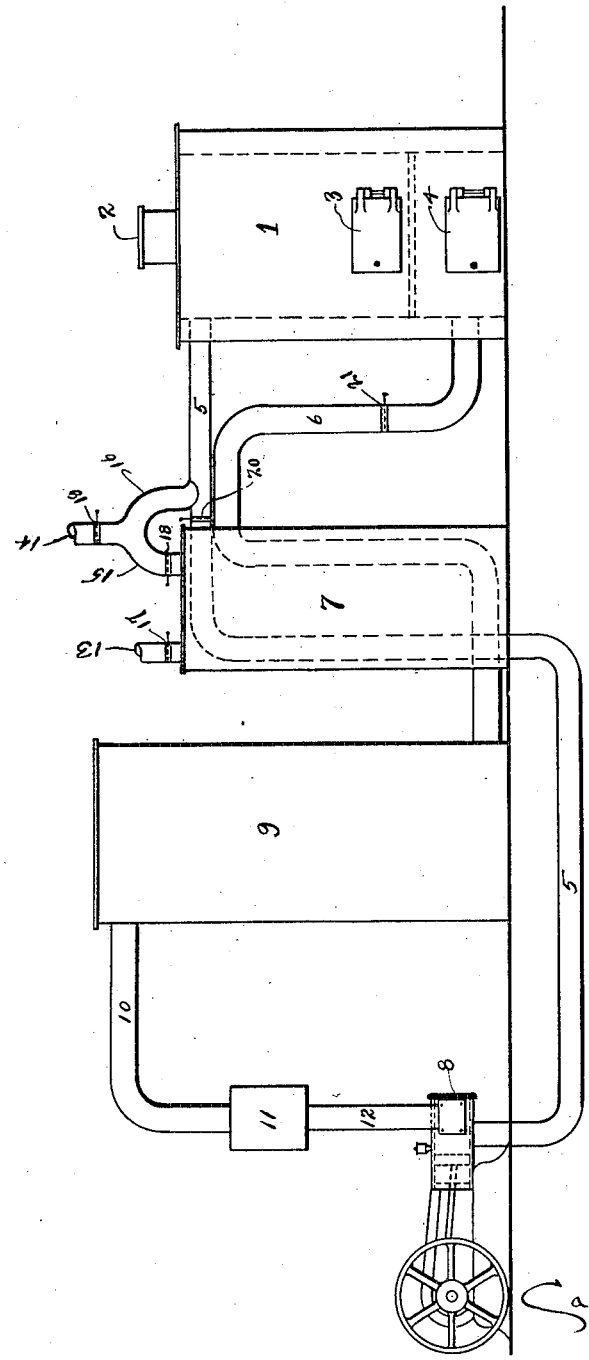

CARLETON ELLIS, OF NEW YORK, N. Y., ASSIGNOR TO COMBUSTION UTILITIES COMPANY, OF NEW YORK, N. Y., A CORPORATION OF NEW YORK.

POWER-GAS PRODUCING AND CONSUMING APPARATUS.

No. 812,194. Specification of Letters Patent. Patented Feb. 13, 1906.

Application filed May 11, 1905. Serial No. 259,926.

*To all whom it may concern:*

Be it known that I, CARLETON ELLIS, a citizen of the United States, and a resident of New York city, in the county of New York and State of New York, have invented certain new and useful Improvements in Power-Gas Producing and Consuming Apparatus, of which the following is a specification.

This invention relates to power-gas producing and consuming apparatus in which a gas-producer is made the source of the combustible gas and an internal-explosion engine the means for gas consumption and power production.

It relates particularly to means for the control of the temperature of the gas-producer without the use of excessive amounts of steam or water-vapor, thereby avoiding the production of combustible gas containing a large amount of the objectionable element—hydrogen.

My invention involves the use of the products of explosion from the gas-engine or of products of combustion from other suitable sources. It involves the use of these products of combustion in the producer in such a way that control of the temperature is secured and formation of objectionable clinker or slag is prevented.

I have found in the operation of gas-producers by means of a draft-current containing products of combustion or carbon dioxid that an important factor in the temperature control of the gas-producer is the temperature of the incoming draft-current. In a draft-current of the nature above mentioned the two reacting constituents—oxygen and carbon dioxid—thermochemically considered, are antithetic in that the reaction of the one is exothermic, while that of the other is endothermic. I have found that the velocity of reaction of each of these constituents is a variable, depending upon the temperature, and that the oxygen reaction is greatly stimulated or accelerated by increase of temperature, while that of carbon dioxid under the same conditions is very little affected. For that reason I have found it generally necessary in order to prevent the formation of clinker in the gas-producer to cool the products of combustion. By bringing about a substantial reduction in temperature the reaction velocities approximate each other and the producer temperature is placed under control.

The introduction of carbon dioxid into a gas-producer has a certain effect on the fuel aside from its endothermic reaction, as will be apparent from a consideration of certain of the laws of physical chemistry. Producer-gas always contains carbon dioxid. Complete reduction to carbon monoxid is impossible. This is due to the fact that a balanced reaction or equilibrium exists, and in accordance with the laws of mass action carbon dioxid cannot be reduced below the point at which a certain partial pressure prevails, this depending on the nature of the producer, &c. The introduction into the gas-producer from an external source of sufficient carbon dioxid to artificially create the aforesaid partial pressure results in largely preventing the formation from the fixed carbon of the coal of any appreciable amount of carbon dioxid. The final and net result, therefore, is the complete gasification of the coal or complete conversion of the fixed carbon of the fuel to carbon monoxid. The carbon dioxid present in the producer-gas ordinarily used in the operation of gas-engines represents as gaseous ash from ten to twenty per cent. of the total calorific value of the gas. The necessity for cooling the gas prior to its introduction into the engine makes it impossible to utilize the great sensible heat of the producer-gas, due to the complete combustion to carbon dioxid of so large a percentage of the fuel in the producer. The creation of aforesaid partial pressure, therefore, represents a very large economy in fuel and gives rise to a producer-gas so rich in combustible matter that the engine-cylinders may be of smaller dimensions than those used in present-day practice.

The object of my invention is to provide a means for the use of products of combustion in a gas-producer adapted to gasification of fuel for gas-engine purposes and to make use of the gas after suitable purification as a source of power.

My invention comprises a gas-producer or battery thereof supplying a gas-engine or battery thereof with combustible gas, a conduit for returning products of combustion from the gas-engine to the gas-producer, means for cooling these products of combustion, and means for their admission into the gas-producer, together with predetermined amounts of air and water-vapor.

In the accompanying diagrammatic drawing, 1 is a gas-producer having the hopper 2, the cleaning-door 3, ash-pit door 4, draft-inlet flue 5, and gas-outlet flue 6.

7 is a cooler and vaporizer.

8 is a gas-engine the products of combustion of which pass through the flue 5 and the cooler 7 to the gas-producer.

9 is a scrubber or purifier through which the combustible gas from the flue 6 after passing through the cooler 7 is subjected to purification, removing the volatile or tarry matters and soot. From the purifiers a flue 10 leads to a pressure-equalizer 11, from which connection to the engine is established by the passage 12.

13 is an air-inlet for admission of air to the cooler and vaporizer 7.

14 is an air-inlet by which fresh air may be entered into the flue 5 between the cooler and producer through the leg 16. Connected to this air-inlet pipe is the leg 15, which establishes connection with the vaporizer and permits of water-vapor or of air and water-vapor being drawn or passed into the flue 5. The valves or dampers 17, 18, 19, 20, and 21 regulate the flow of gases and serve where needed to proportion the relative amounts of oxygen and carbon dioxid or products of combustion and water-vapor which enter the producer.

The operation of my apparatus is as follows: In the gas-producer 1 a bed of fuel of suitable depth for gasification is brought to the proper state of ignition, and through this fuel mass is passed a draft-current composed of air admitted either through inlet 14 or through inlet 13, in which case it will carry water-vapor containing also products of combustion. The gas produced departs through the passage 6, is cooled in the vaporizer 7, purified in the scrubber 9, and is delivered at the engine, where by admixture with air and subsequent explosion its heat energy is converted into mechanical motion. That portion of the products of combustion required in the gas-producer is carried back through the flue 5 to the vaporizer 7, where by contact with walls chilled by external contact with water or otherwise the gases are cooled below that critical point at which clinkering in the gas-producer would be incurred. From thence after mingling with the air and water-vapor they enter the producer, where by the endothermic reaction of the carbon dioxid and steam the temperature of the producer is maintained at an efficient gasifying-point. By regulating the amount of water-vapor which is so admitted the formation of large amounts of hydrogen is prevented, thereby obviating all troubles from premature ignition of the engine.

In ordinary practice in this art increase in temperature of the gas-producer causes an increase in the amount of steam or water-vapor supplied thereto. It consequently happens that large amonts of hydrogen may be produced at inopportune times, causing premature ignition and resulting in injury or wreckage of the apparatus. By the present invention such troubles are eliminated, inasmuch as temperature control is attained by a mixture of water-vapor and products of combustion. Reduction of the former to a very large degree is thereby rendered possible. At the same time a combustible gas is generated which, owing among other reasons to the satisfaction of the partial pressure of the carbon dioxid, is rich in combustible matter.

I do not limit myself to the use of products of combustion solely from the gas-engine. In certain cases it may be preferable to derive the products of combustion from furnaces or steam-generators or from heating and calcining kilns of various descriptions. I do not restrict myself to any precise form of construction, and I have therefore depicted my invention diagrammatically.

What I claim is—

1. In a power-gas producing and consuming apparatus, the combination of a gas-producer, a gas-engine, a cooled gas-delivery pipe connecting producer and engine; a cooled pipe connection abstracting products of combustion from the engine and delivering the same into the producer, and means opening directly into the atmosphere for admitting air into the cooled products of combustion.

2. In a power-gas producing and consuming apparatus, the combination of a gas-producer, a gas-engine, a cooling vessel adapted to contain water, a gas-delivery pipe connecting producer and engine and passing through said vessel, a pipe connection abstracting products of combustion from the engine and delivering the same into the producer, also passing through said vessel, means opening directly into the atmosphere for admitting air into the products of combustion cooled thereby and means also admitting vapors from said vessel into the products of combustion.

3. In a power-gas producing and consuming apparatus, the combination of a gas-producer, a gas-engine, a gas-delivery pipe connecting producer and engine, a cooling vessel adapted to contain water, a pipe connection abstracting products of combustion from the engine and delivering the same into the producer, and passing through said vessel, means opening into the atmosphere for admitting air into said products after passing the vessel, and means also admitting vapors from said vessel into said products of combustion.

4. In a power-gas producing and consuming apparatus, the combination of a gas-producer, a gas-engine, a gas-delivery pipe connecting producer and engine, means for returning products of combustion from the engine to the producer, means for cooling said products of combustion, and means for mingling the cooled products of combustion with cool air and with water-vapor.

5. In a power-gas producing and consuming apparatus, the combination of a gas-producer, a gas-engine, a gas-delivery pipe connecting producer and engine, a purifying device in said delivery-pipe, means for returning products of combustion from the engine to the producer, means for cooling said products of combustion, means for the admission of air to the cooled products and means for the admission of water-vapor.

6. In a power-gas producing and consuming apparatus, the combination of a gas-producer, a gas-engine, a water-cooled gas-delivery pipe connecting producer and engine, a water-cooled pipe connection abstracting products of combustion from the engine and delivering the same into the producer and means for introducing the water vaporized in said cooling into the products of combustion after cooling.

Signed by me, CARLETON ELLIS, in the county of New York and State of New York, this 10th day of May, A. D. 1905.

CARLETON ELLIS.

Witnesses:
  JAS. D. GRANT,
  A. M. SENIOR.